United States Patent [19]

Harigaya et al.

[11] Patent Number: 5,341,073
[45] Date of Patent: Aug. 23, 1994

[54] DEVICE FOR CONTROLLING REEL DRIVING MOTOR

[75] Inventors: Isao Harigaya, Yokohama; Susumu Kozuki, Tokyo, both of Japan

[73] Assignee: Canon Kabushiki Kaisha, Tokyo, Japan

[21] Appl. No.: 846,774

[22] Filed: Mar. 9, 1992

Related U.S. Application Data

[60] Continuation of Ser. No. 679,830, Apr. 1, 1991, abandoned, which is a continuation of Ser. No. 296,613, Jan. 13, 1989, abandoned, which is a division of Ser. No. 936,741, Dec. 2, 1986, Pat. No. 4,817,887.

[30] Foreign Application Priority Data

| Dec. 13, 1985 | [JP] | Japan | 60-279125 |
| Dec. 13, 1985 | [JP] | Japan | 60-279126 |
| Dec. 25, 1985 | [JP] | Japan | 60-295313 |
| Dec. 25, 1985 | [JP] | Japan | 60-297225 |
| Dec. 27, 1985 | [JP] | Japan | 60-297226 |

[51] Int. Cl.$^5$ ............................................. B65H 59/38
[52] U.S. Cl. ............................................. 318/7; 318/599
[58] Field of Search .............. 318/7, 599; 375/22; 340/825.63, 825.64; 341/178, 179, 181, 182

[56] References Cited

U.S. PATENT DOCUMENTS

| 2,896,140 | 7/1959 | Fuge | 318/599 X |
| 3,921,043 | 11/1975 | Luzio | 318/7 |
| 4,015,799 | 4/1977 | Koski et al. | 242/203 |
| 4,125,881 | 11/1978 | Eige et al. | 360/50 |
| 4,448,368 | 5/1984 | Skalko | 318/7 |
| 4,525,654 | 6/1985 | Tajima et al. | 318/7 |
| 4,573,645 | 3/1986 | Harris, Jr. | 318/7 |
| 4,612,533 | 9/1986 | Evans | 340/347 |
| 5,039,027 | 8/1991 | Yanagihara et al. | 242/190 |
| 5,146,601 | 9/1992 | Hosaka et al. | 395/800 |

FOREIGN PATENT DOCUMENTS 56-127957 10/1981 Japan .

Primary Examiner—William M. Shoop, Jr.
Assistant Examiner—Brian Sircus
Attorney, Agent, or Firm—Fitzpatrick, Cella, Harper & Scinto

[57] ABSTRACT

A device for running a tape-like medium between a pair of reels in accordance with one of a plurality of tape-running modes having different tape running speeds has the following constituents, a reel driving apparatus for rotating the reels; a circuit for detecting the states of rotation of the reels and for generating reel rotation data; an instruction circuit for giving an instruction for changing the tape running mode; a holding device or memory for holding the reel rotation data when the tape running mode is changed in response to the instruction given by the instruction circuit; and a control circuit for controlling the reel driving apparatus in accordance with the reel rotation data held by the memory, for a predetermined period after the changing of the tape running mode effected by the instruction circuit.

28 Claims, 11 Drawing Sheets

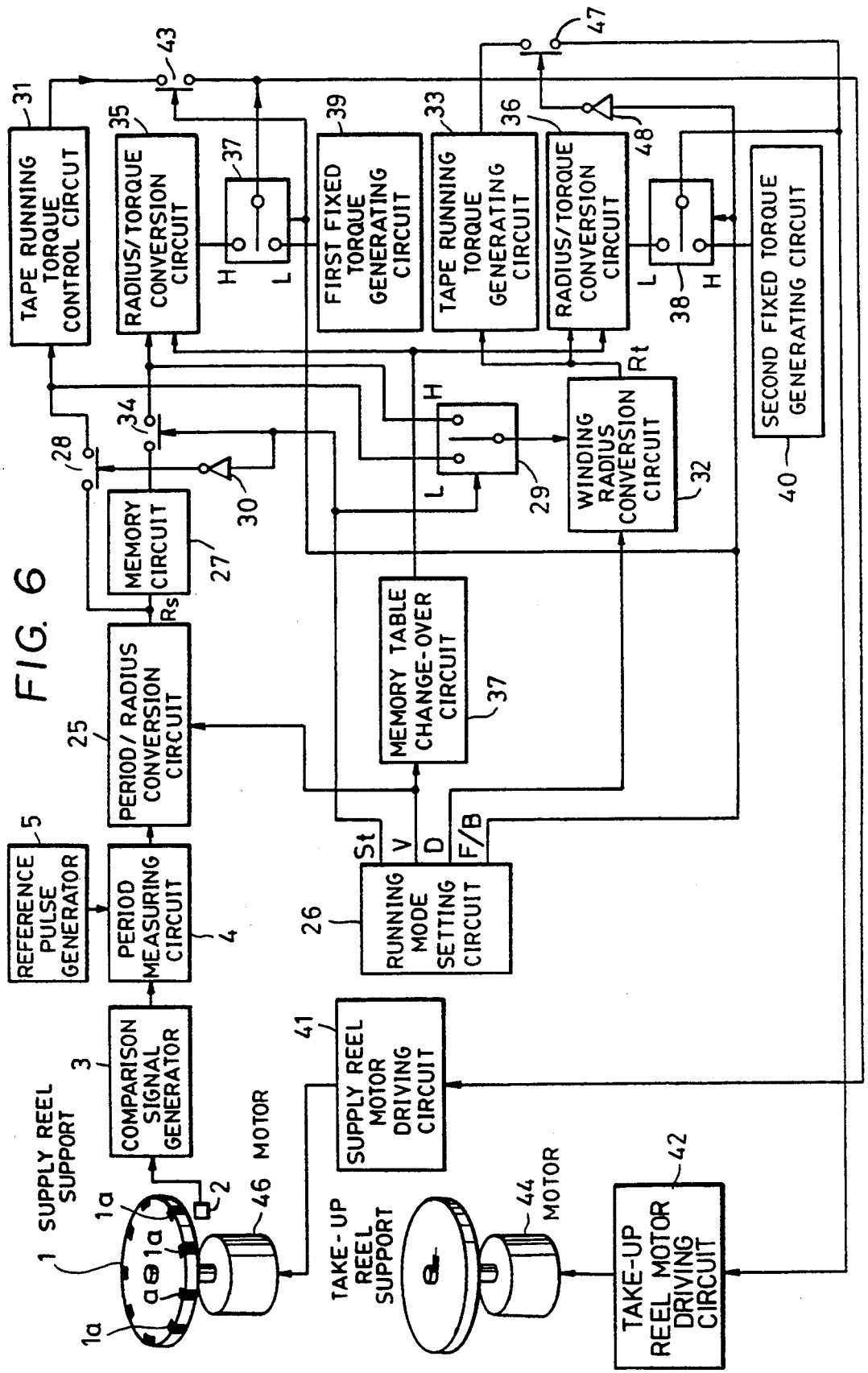

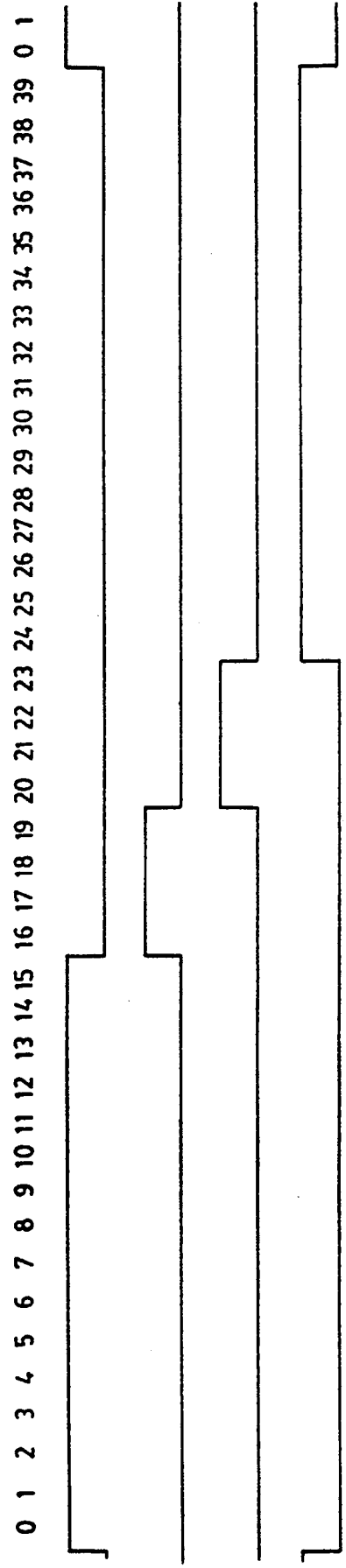

DEVICE FOR CONTROLLING REEL DRIVING MOTOR

This application is a continuation of application Ser. No. 07/679,830 filed Apr. 1, 1991, now abandoned, which is a continuation of Ser. No. 07/296,613 filed Jan. 13, 1989, now abandoned, which is a divisional of application Ser. No. 06/936,741, filed Dec. 2, 1986 now U.S. Pat. No. 4,817,887.

BACKGROUND OF THE INVENTION

1. Field of the Invention

The present invention broadly relates to a system in which a tape-like member such as a recording medium (referred to as "tape" hereinafter) is made to run between two reels in accordance with one of a plurality of tape running modes having different tape-running speeds. More particularly, the present invention is concerned with a control apparatus for controlling the operation of the reel motors in such a system, in accordance with the selected tape running mode.

2. Description of the Prior Art

A recording/playback system has been known in which a tape runs between two reels, i.e., a supply reel and a take-up reel, wherein the reel support for the supply reel and the take-up reel are driven by independent driving motors. This type of tape driving mechanism is generally referred to as "direct drive tape-running mechanism". In this type of mechanism, the rotation speeds of the reels are controlled in accordance with control signals which are produced by a computing circuit in response to signals which represent the periods of rotation of respective reels.

When the tape is to be stopped, the driving motor for the take-up reel support or a capstan motor is stopped, while the supply reel support driving motor is reversed with a predetermined braking torque, so as to tension the tape.

This known tape driving mechanism has the following problem, particularly when the tape running mode is changed. Namely, the control of the driving motors upon detection of the periods of rotation of the motors is conducted even when the running mode is being changed, so that the output torques of the motor may be changed drastically, with the result that the tension on the tape is abruptly changed, thus adversely affecting the tape.

Another problem encountered by the conventional mechanism is attributable to the fact that the braking torque is not controlled in accordance with the instant conditions of the reels when the running tape is to be stopped. Namely, in the conventional mechanism, the level of the reversing or braking torque is maintained constant regardless of the state of rotation of the reel, although the state of rotation of the reel is momentarily changed according to the amount of the tape wound on the reel. This may cause the reel to be braked abruptly, with the result that the tape is stretched or slacked due to the inertia of the reel or the impact produced by the braking. This problem causes an impediment to the current demand for making the tape thinner which is necessary for attaining longer recording or playing time.

The change in the tension of the tape also causes a change in the contact between the tape and the recording and reproducing heads, which causes wear of these heads.

In general, the recording/playback apparatus of the kind described is required to control the reel motors to provide different tape speeds, as in the case in a changeover from the fast forward (FF) mode to the ordinary playback (PLAY) mode. It is also required that the tape tension be maintained constant regardless of the winding radius, i.e., the radius of the tape wound on the reel, which increases or decreases momentarily. To cope with these demands, it is necessary to perform a complicated computation, in order to optimally control the driving torque of the take-up reel motor in accordance with changes in operating conditions. Hitherto, the torque control of the reel motor has been carried out by varying the pulse width of the reel motor driving signal, such that a greater motor output torque is obtained as the pulse width of the motor driving signal is increased. This control method, however, requires an impractically long computing time, because a series of complicated computations has to be performed from the beginning, even in response to a slight change in operating conditions. It is to be noted also that the pulses have to be counted from the beginning for the purpose of setting the pulse width. During the counting of the pulses, all other operations are prohibited.

SUMMARY OF THE INVENTION

Accordingly, an object of the present invention is to provide an apparatus for controlling reel motors in such a manner as to overcome the above-described problems of the prior art.

Another object of the present invention is to provide an apparatus for controlling reel motors which is capable of eliminating any unfavorable effect on the tape which may otherwise be caused when the tape running mode is changed, thus ensuring stable running of the tape.

To these ends, according to one aspect of the present invention, there is provided a device for running a tape-like medium between a pair of reels in accordance with one of a plurality of tape-running modes having different tape running speeds, comprising: reel driving means for rotating the reels; detecting means for detecting the states of rotation of the reels and for generating reel rotation data; instruction means for giving an instruction for changing the tape running mode; holding means for holding the reel rotation data when the tape running mode is changed in response to the instruction given by the instruction means; and controlling means for controlling the reel driving means in accordance with the reel rotation data held by the holding means for a predetermined period after the changing of the tape running mode effected by the instruction means.

Still another object of the present invention is to provide an apparatus for controlling reel motors which is capable of stopping a tape without adversely affecting the tape.

To this end, according to another aspect of the present invention, there is provided a device for running a tape-like medium between a pair of reels in accordance with one of a plurality of tape-running modes having different tape running speeds and for stopping the tape-like medium, comprising: reel driving means for rotating the reels; detecting means for detecting the states of rotation of the reels and for generating reel rotation data; instruction means for giving an instruction for stopping the running of the tape-like medium; stopping control data output means for outputting, for a predetermined period, stopping control data corresponding both to the reel rotation data from the detecting means and the instant tape running mode, in response to the stopping instruction given by the instruction means; and controlling means for controlling the reel driving means in accordance with the stopping control data from the stopping control data output means.

A further object of the present invention is to provide an apparatus for controlling reel motors which is capable of reversing a tape without adversely affecting the tape.

To this end, according to still another aspect of the invention, there is provided a device for running a tape-like medium between a first reel and a second reel in accordance with a plurality of tape-running modes having different tape running speeds, comprising: first detecting means for detecting the state of rotation of the first reel and for outputting first reel rotation data corresponding to the detected state of rotation; second detecting means for outputting second reel rotation data corresponding to the state of rotation of the second reel in response to the first reel rotation data; first rotation control means for controlling the rotation of the first reel in accordance with the first reel rotation data given by the first detecting means; and second rotation control means for controlling the rotation of the second reel in accordance with the second reel rotation data given by the second detecting means.

In another of its aspects, the present invention provides a device for controlling the running of a tape-like medium comprising: a driving means for driving a reel on which the tape-like medium is wound; detecting means for detecting the state of rotation of the reel and for producing reel rotation data in accordance with the detected state of rotation; instruction means for giving an instruction for changing the speed of rotation of the reel; holding means for holding the reel rotation data in response to the instructions given by the instruction means; and controlling means for controlling the driving means by selectively using one of the reel rotation data held by said holding means and the reel rotation data from the detecting means, in response to the instruction given by the instruction means.

A still further object of the present invention is to provide an apparatus for controlling reel motors which is capable of performing, when the reel motors are to be stopped, a precise control of torque with minimum response time.

To this end, according to a further aspect of the present invention, there is provided a device for controlling the state of rotation of a rotational member, comprising: a driving motor for rotating the rotational member; first pulse signal generating means for generating a pulse having a pulse width which is determined with a first level of resolving power; second pulse signal generating means for generating a pulse having a pulse width which is determined with a second level of resolving power higher than the first level; control torque data generating means for generating control torque data in accordance with which the torque of the driving motor is controlled; torque control pulse signal generating means for generating a torque control pulse signal in accordance with the control torque data, by using at least the first pulse signal generating means; switching means for switching, in accordance with the control torque data, the output of the second pulse signal generating means for use in one of the operation of the torque control pulse signal generating means and the control of the torque control pulse signal generating means; and torque control means for controlling the torque of the driving motor in accordance with the pulse width of the torque control pulse signal generated by the torque control pulse signal generating means.

A still further object of the present invention is to provide an apparatus for controlling reel motors which is capable of producing torque control pulse signals in a short time and with a high accuracy thereby effecting quick and accurate torque control.

To this end, according to a still further aspect of the present invention, there is provided a device for controlling the state of rotation of a rotational member, comprising: a driving motor for rotating the rotational member; pulse signal generating means for generating a plurality of types of pulse signals which are formed with different levels of resolving power; control torque data generating means for generating control torque data in accordance with which the torque of the driving motor is controlled; torque control pulse signal generating means for generating a torque control pulse signal of a pulse width corresponding to the control torque data, by using at least one having the plurality of types of pulse signals generated by the pulse signal generating means and outputting the thus-generated torque control pulse signal; and torque controlling means for controlling the torque of the driving motor in accordance with the pulse width of the torque control pulse signal generated by the torque control pulse signal generating means.

These and other objects, features and advantages of the present invention will become clear from the following description of the preferred embodiments taken in conjunction with the accompanying drawings.

BRIEF DESCRIPTION OF THE DRAWINGS

FIG. 6 is a schematic illustration of a third embodiment of the present invention, for use with a VTR tape running/stopping mechanism of the direct driving type in which a supply reel support and a take-up reel support are directly driven by independent driving motors;

FIG. 7($b$) is a timing chart illustrating the manner in which the pulse widths S are set for given torque values T in a conventional apparatus;

Figure 8:
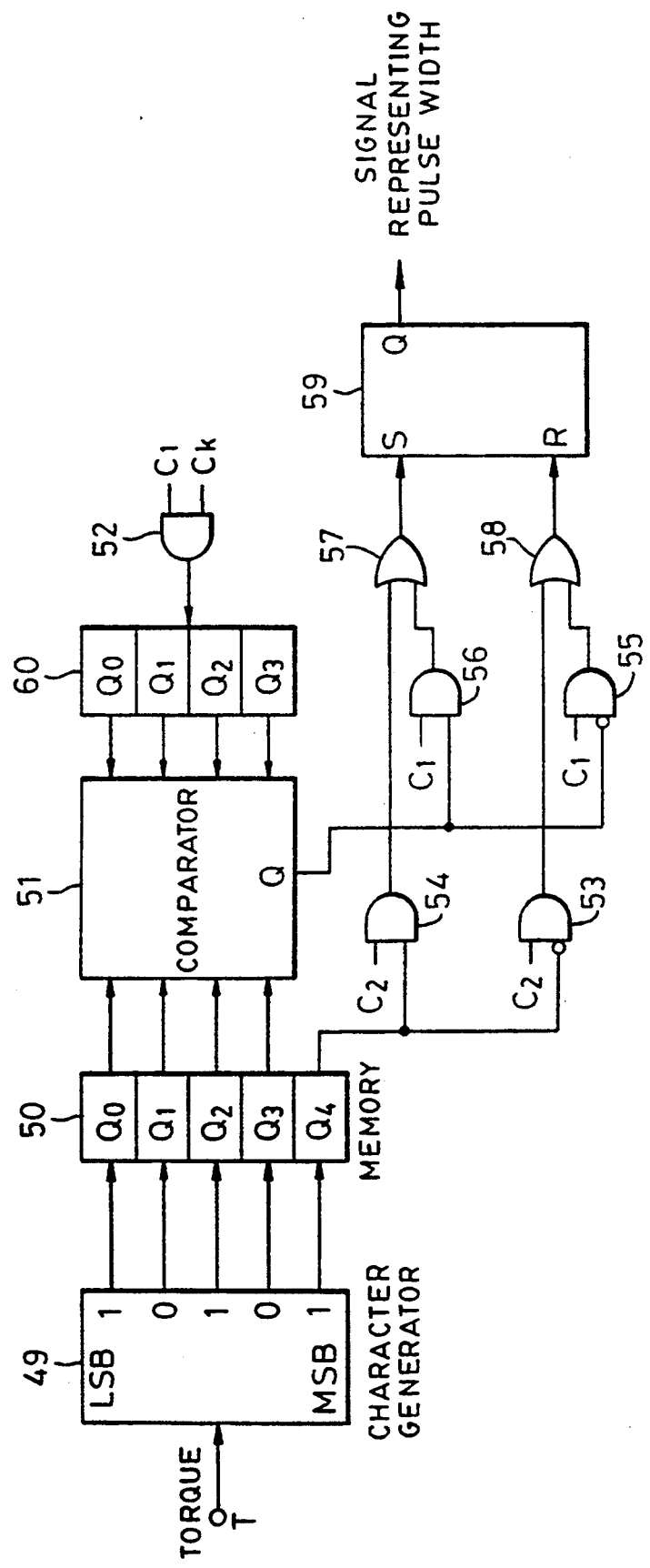
Figure 9:
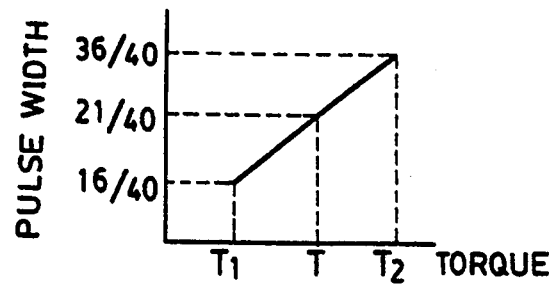
Figure 10:
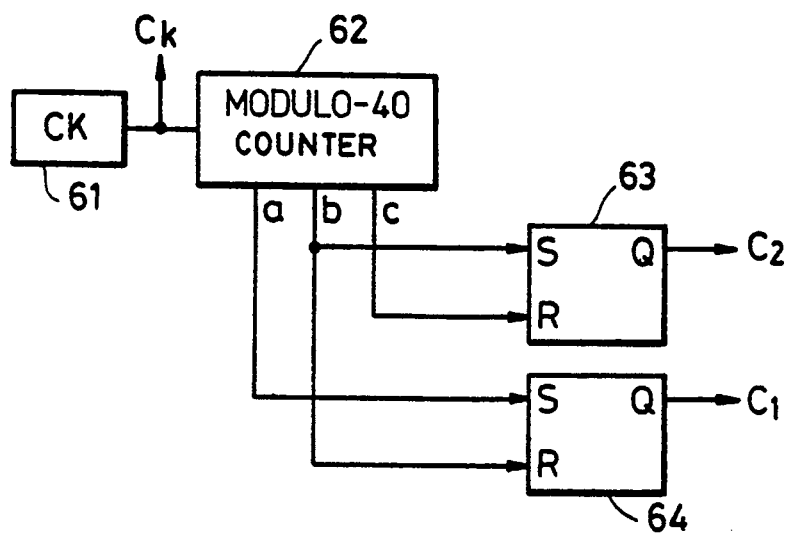
Figure 11:
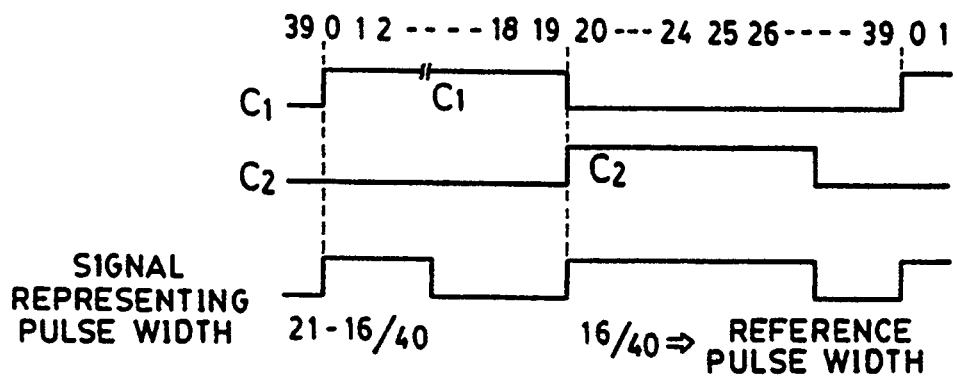
Figure 12A:
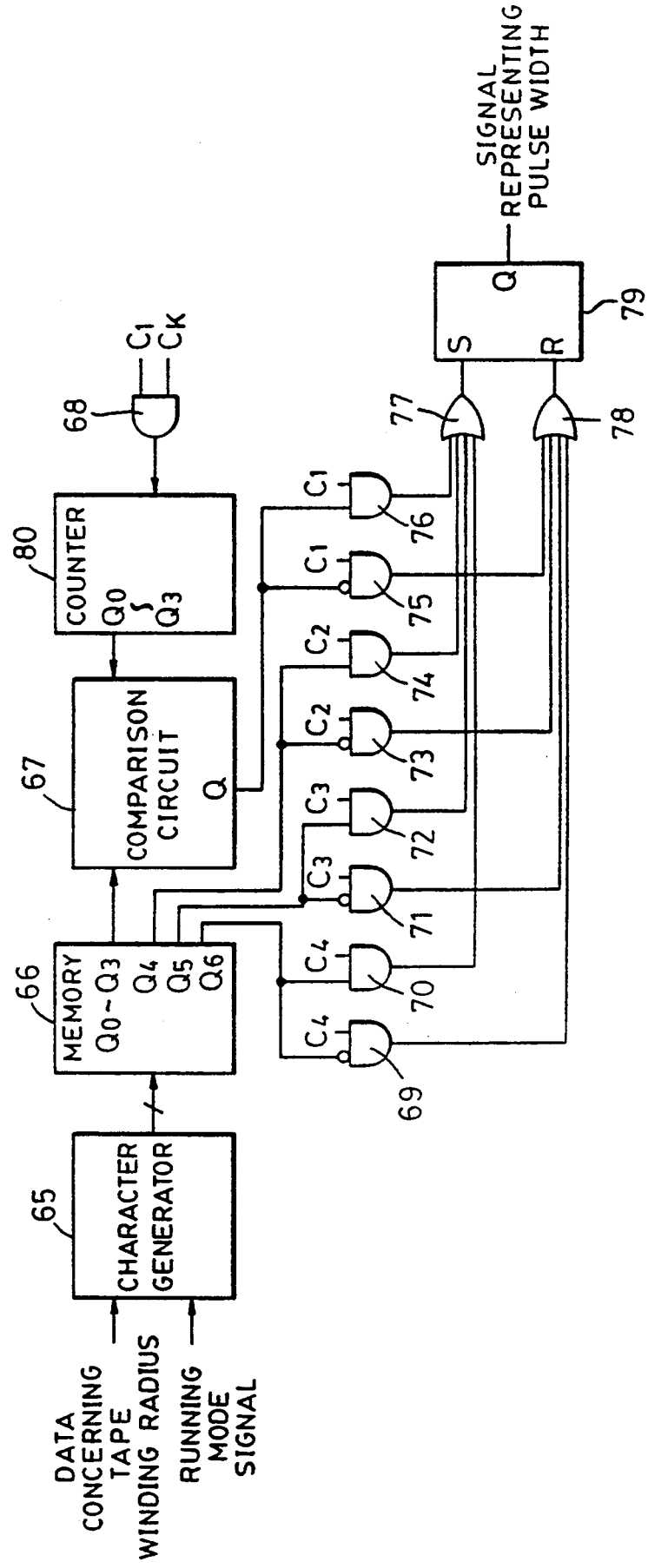
Figure 12:
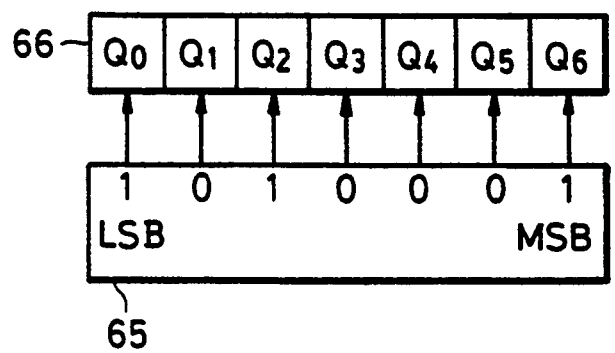
Figure 13:
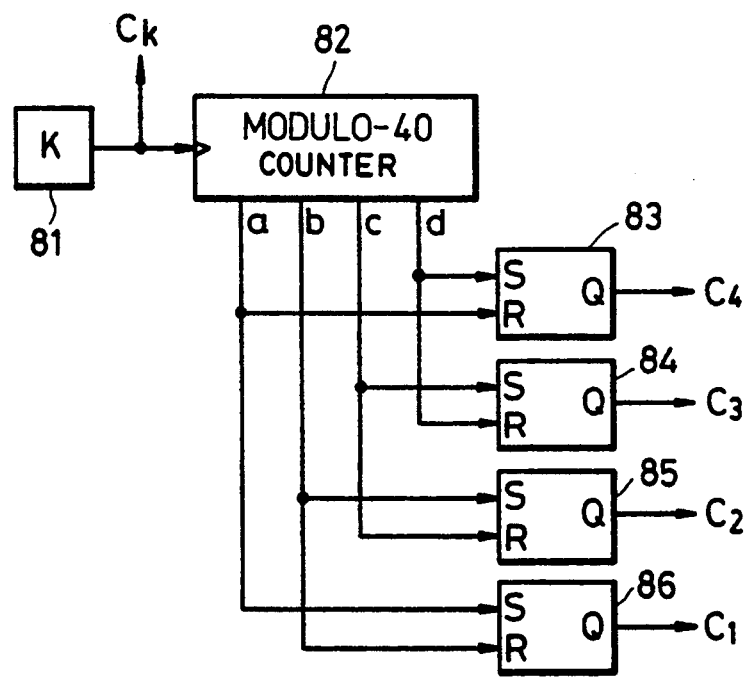
Figure 14:
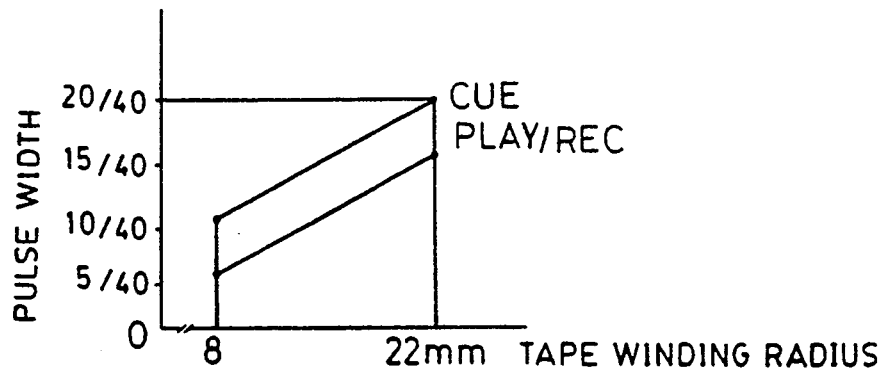
Figure 15:
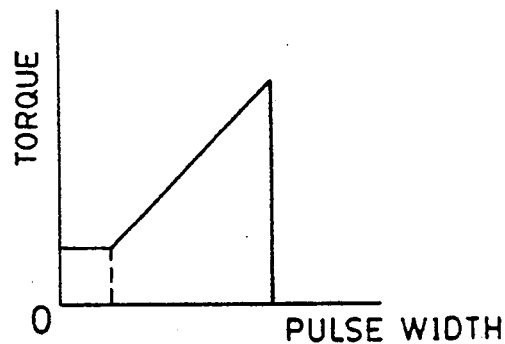
Figure 16:
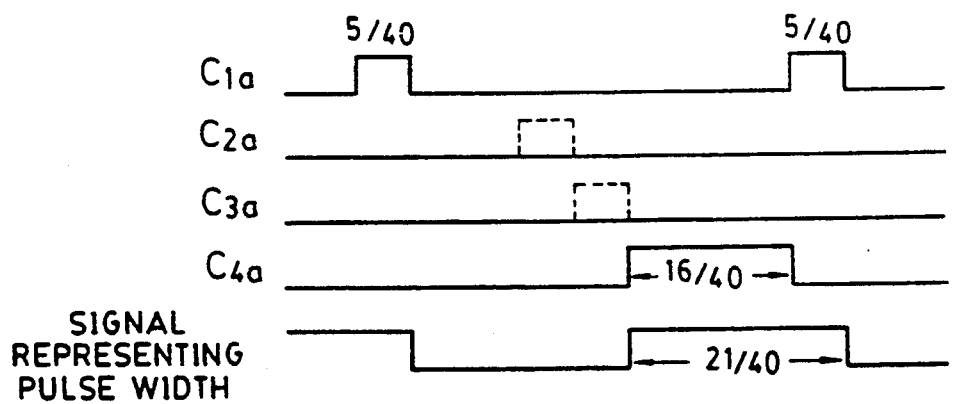

FIG. (c) is a timing chart illustrating the manner in which the pulse widths S are set for given torque values T in the apparatus of the present invention;

FIG. 8 is a block diagram of a torque-pulse width conversion circuit incorporated in the fourth embodiment of the present invention;

FIG. 9 is a graph illustrating the relationship between the-torque and the pulse width as obtained in the circuit shown in FIG. 8;

FIG. 10 is a block diagram of a circuit for generating timing pulses $C_1$ and $C_2$ which are used in the circuit shown in FIG. 8;

FIG. 11 is a timing chart showing the timings and the pulse widths of the timing pulses $C_1$ and $C_2$ generated in the circuit of FIG. 10 and used in the circuit of FIG. 8;

FIG. 12(a) is a block diagram of a winding radius-pulse width conversion circuit used in a fifth embodiment of the invention;

FIG. 12(b) is an illustration of the state of data supplied to a memory 66 when the pulse widths are designated by the character generator 65 in the circuit shown in FIG. 12(a);

FIG. 13 is a block diagram of a circuit for generating timing pulses $C_1$, $C_2$, $C_3$ and $C_4$ in the circuit shown in FIG. 12(a);

FIG. 14 is a chart illustrating the relationship between the tape winding radius and the pulse width in the operation of the circuit shown in FIG. 12(a) in different tape running modes;

FIG. 15 is an illustration of the relationship between the pulse width and the torque of the reel motor in the embodiment of FIG. 12(a);

FIG. 16 is a timing chart showing the timing of the timing pulses $C_1$, $C_2$, $C_3$ and $C_4$ used in the circuit shown in FIG. 12(a), as well as the timing of a signal representing the pulse width; and FIG. 17 is a timing chart illustrating the timing of the timing pulses $C_1$, $C_2$, $C_3$ and $C_4$ generated in the circuit shown in FIG. 13.

DESCRIPTION OF THE PREFERRED EMBODIMENTS

Preferred embodiments of the invention will be described hereinunder with reference to the accompanying drawings.

Figure 1:
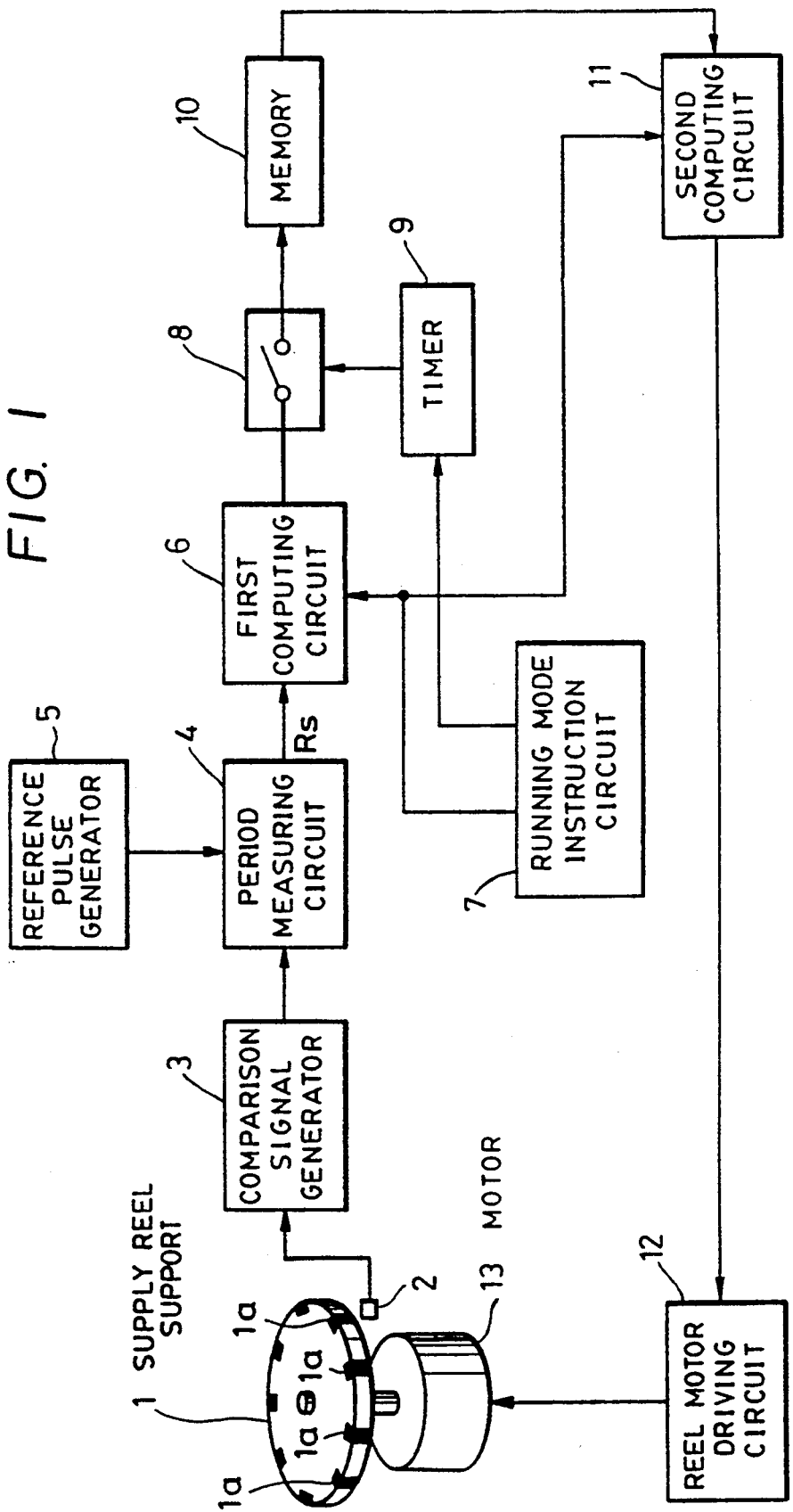
FIG. 1 is a schematic illustration of a first embodiment of the present invention, for use with a VTR tape running mechanism of the direct driving type in which a supply reel support and a take-up reel support are directly driven by independent driving motors.
Figure 2:
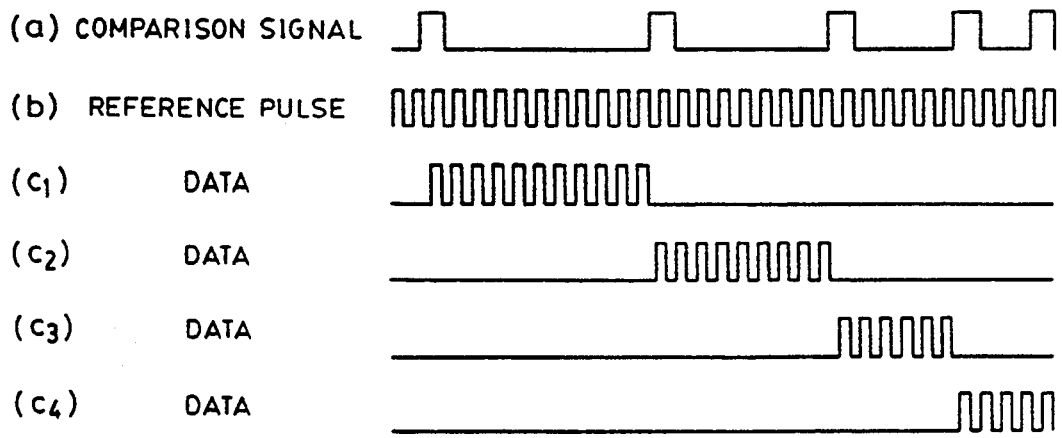
FIG. 2 is a timing chart illustrating the timing of pickup data corresponding to the period of rotation of the supply reel support in the embodiment shown in FIG. 1.
Figure 3:
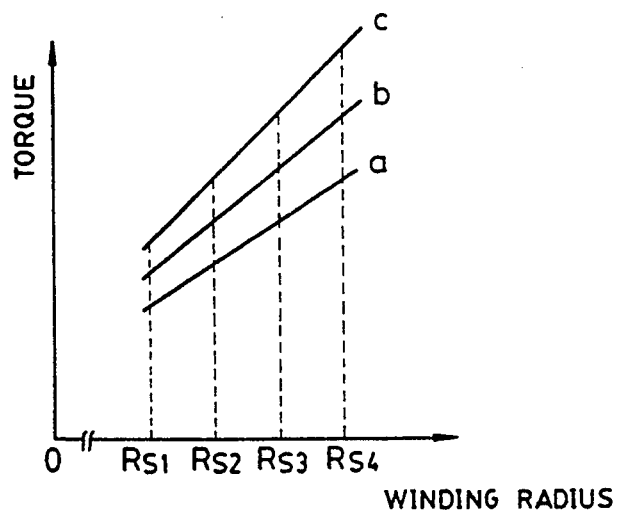
FIG. 3 is a graph showing the relationship between the winding radius and the torque in different tape running modes in the embodiment shown in FIG. 1.

FIGS. 1, 2 and 3 show a first embodiment of the invention as well as the timing and torque/winding radius operating characteristics thereof. More specifically, FIG. 1 is a schematic illustration of the first embodiment of the present invention, applied to a VTR tape running mechanism of the direct driving type in which the supply reel support and the take-up reel support are directly driven by independent driving motors. FIG. 2 is a timing chart illustrating the timing of the pickup of period data corresponding to the period of rotation of the supply reel support in the embodiment shown in FIG. 1. FIG. 3 is a graph showing the relationship between the winding radius and the torque as observed in different tape running modes in the embodiment shown in FIG. 1.

Referring first to FIG. 1, a plurality of small magnet pieces 1a are attached to a supply reel support 1 at a constant circumferential pitch, and a fixed pickup head 2 is disposed such that it faces the path of rotation of the small magnet pieces. The output from the pickup head 2 is delivered to a comparison signal generator 3 which in turn produces a comparison signal corresponding to the period of rotation of the supply reel support 1 as shown by (a) in FIG. 2. The thus produced comparison signal is delivered to a period measuring circuit 4.

The period measuring circuit 4 receives, from a reference pulse generator 5, reference pulses which are shown at (b) in FIG. 2. As will be seen from FIG. 2, the frequency of the reference pulses is much higher than that of the comparison signal. The period measuring circuit 4 counts the reference pulses and produces period data shown at $c_1$ to $c_4$ which are delivered to a first computing circuit 6.

The first computing circuit 6 also receives a running mode signal derived from a running mode instruction circuit 7. The running mode signal is a signal which corresponds to tape running speed in a tape running mode which has been selected through an operation section (not shown) from among a plurality of modes such as recording/playback tape running mode, high-speed search tape running mode, and fast forwarding tape running mode.

The first computing circuit 6 is constituted by a multiplier and a divider which are omitted from the drawings. This circuit performs, on the basis of the period data and the tape running mode signal, a computation in accordance with the following formula, thereby determining the winding radius R of the tape on the reel:

$$R = V\, t/2\pi$$

where, V represents the tangential tape running speed, t represents the period of rotation of the supply reel support 1, and $\pi$ is a constant. The thus determined winding radius is output as winding radius data Rs. The winding radius data Rs thus delivered by the first computing circuit 6 is fed to a switch circuit 8 which performs a switching operation in accordance with a switch control signal delivered from a timer circuit 9.

The switch circuit 8 is normally held in an ON (i.e. closed) state. When the timer circuit 9 receives a change-over pulse from the tape running mode instruction circuit 7 at the time of changing the tape running mode, the circuit 9 turns the switch circuit 8 off (i.e. open) and, after the lapse of a predetermined time, turns the switch circuit 8 on again. The time length set in the timer circuit 9 corresponds to a period which is necessary for the tape running system to stabilize after the change-over of the tape running mode. It is possible to arrange the timer circuit 9 such that different time lengths are set for different tape running modes and are selected so that the timer circuit 9 operates for the time length corresponding to the selected tape-running mode. It is to be noted, however, that the use of the timer circuit is not essential. For instance, the arrangement may be such that whether the tape running state has stabilized is ascertained through the detection of, for example, the tape tension or the state of operation of the reel motor or the capstan motor, and the switch circuit 8 is operated in accordance with the result of such detection. Such a method will enable the tape tension to be controlled more delicately and accurately.

The winding radius data Rs is transmitted through the switch circuit 8 to a memory circuit 10 and is held in the latter until new data is received. Thus, when new data is supplied to the memory circuit 10, the old data is erased and the new data is stored in the memory circuit 10. This means that, as long as the switch circuit 8 is held in an off state, the memory circuit 10 holds the winding radius data Rs which was obtained immediately before the changing of the tape running mode, but the data Rs is renewed whenever new winding radius data Rs is received by the memory circuit 10 after the switch circuit 8 is turned on.

The winding radius data Rs thus obtained and stored is read from the memory circuit 10 and is input to a second computing circuit 11 which is adapted to compute, on the basis of the winding radius data, the value of the torque which has to be produced by the reel motor 13 for driving the supply reel support 1.

In FIG. 3, curves a, b and c represent the optimum relationships between the varying tape winding radius and the torque in the recording/playback tape running mode, high-speed search tape running mode and the fast forward tape running mode, respectively. It will be seen that the optimum relation between the tape winding radius and the torque varies according to the tape running mode. Therefore, the second computing circuit 11 for computing the torque receives also the tape running mode signal representing the instant tape running mode, and computes the torque both on the basis of the winding radius data Rs and the tape running mode signal. The thus computed torque value is output as torque data.

The driving circuit 12 for driving the supply reel motor 13 controls the torque of the motor 13 in accordance with the torque data. The motor 13 in turn controls the rotation of the supply reel support 1.

As will be understood from the foregoing description, in the first embodiment of the invention, the torque data is computed in accordance with the winding radius data obtained immediately before the change in the tape running mode, and, after the lapse of a predetermined period for assuring stabilization of the tape running system, the torque data is computed from the winding radius data which in turn is determined on the basis of the period of rotation of the supply reel support. The torque of the motor for driving the supply reel support is controlled in accordance with the thus obtained torque data so as to precisely control the amount of feed of the tape. As a consequence, the tape tension is always optimized, thereby eliminating any unfavorable effect on the tape.

Figure 4:
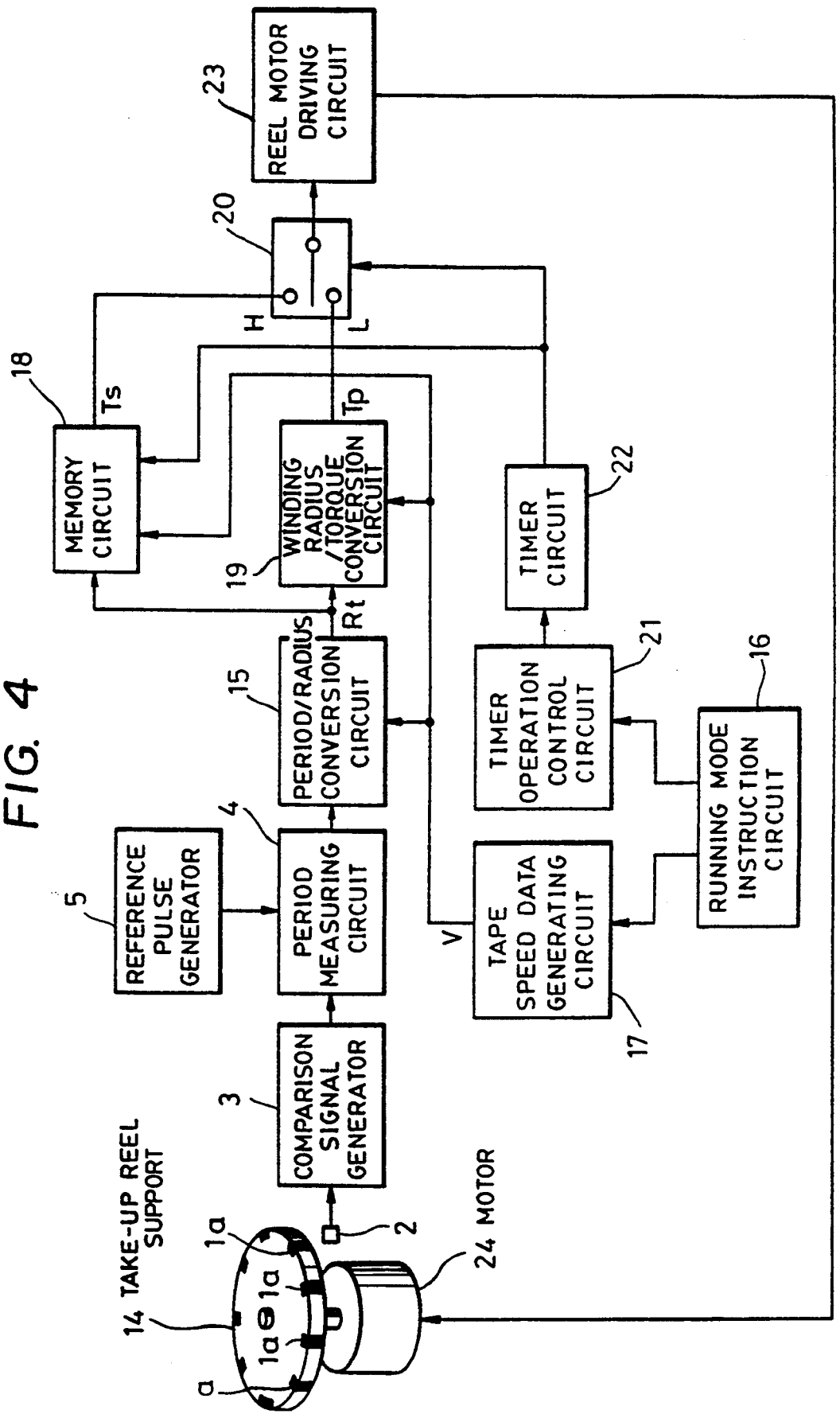
FIG. 4 is a schematic illustration of a second embodiment of the invention for use with a tape stopping mechanism of a VTR of the direct driving type in which a take-up reel support is directly driven.

FIG. 4 is a schematic illustration of a second embodiment of the present invention, applied to a direct-driving type tape running/stopping mechanism for a VTR in which both the supply and the take-up reel supports are directly driven by independent motors. In FIG. 4, the same reference numerals are used to denote the same parts or members as those in FIG. 1, and a description of such parts or members is omitted to avoid duplication of the explanation.

Referring first to FIG. 4, as in the case of the arrangement shown in FIG. 1, a plurality of small magnet pieces 1a are attached to a take-up reel support 14 at a constant circumferential pitch, and a fixed pickup head 2 is disposed such that it faces the path of rotation of the small magnet pieces. The output from the pickup head 2 is delivered to a comparison signal generator 3 which in turn produces a comparison signal corresponding to the period of rotation of the take-up reel support 14 as shown by (a) in FIG. 2. The thus produced comparison signal is delivered to a period measuring circuit 4.

The period measuring circuit 4 receives reference pulses which are generated by a reference pulse generator 5 and are shown at (b) in FIG. 2. As will be seen from FIG. 2, the frequency of the reference pulses is much higher than that of the comparison signal. The period measuring circuit 4 counts the reference pulses and produces period data shown at $c_1$ to $c_4$ (FIG. 2) which is delivered to a period/winding-radius conversion circuit 15.

The period/winding-radius conversion circuit 15 also receives tape running speed data V corresponding to the tape running mode selected by a tape running mode instruction circuit 16 and supplied from the tape speed data generating circuit 17. Upon receipt of these data signals, the period/winding-radius conversion circuit 15 computes the radius R of the tape wound on the take-up reel, in accordance with the aforementioned formula of $R = V t/2\pi$. The result is output as the take-up winding radius data Rt.

The output from the period/winding-radius conversion circuit 15 is input to a memory circuit 18 and a radius/torque conversion circuit 19. Upon receipt of the take-up winding radius data Rt, as well as the tape running speed data V, the radius/torque conversion circuit 19 performs a computation of the optimum torque for the instant tape running state, and delivers the computation result as optimum tape-running torque data Tp.

Figure 5:
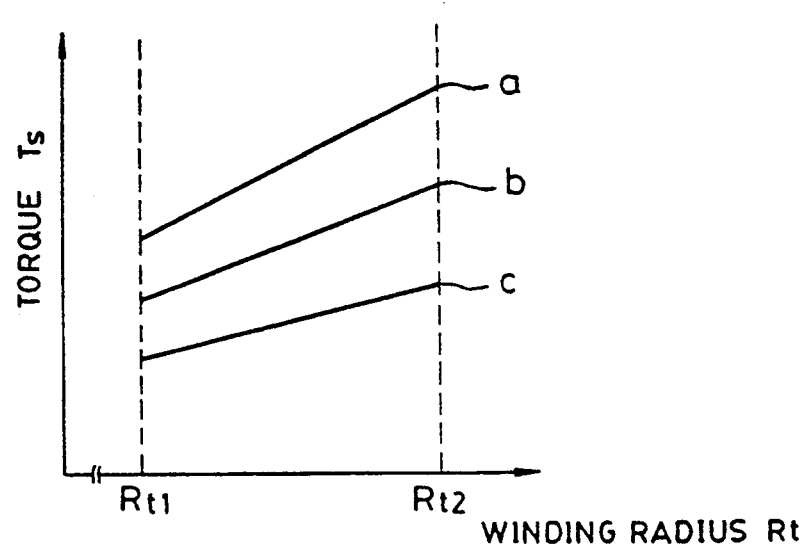
FIG. 5 is a graph showing the relationship between the winding radius and the torque in different tape running modes in the embodiment shown in FIG. 4.

The memory circuit 18 also stores optimum tape stopping torque data Ts in relation to the take-up winding radius data Rt as shown in FIG. 5. When a reading trigger is input to the memory circuit 18 while the address for the given take-up winding radius data Rt is designated, the optimum tape stopping torque data Ts corresponding to the take-up winding radius data Rt is read out from the memory circuit 18.

Referring now to FIG. 5, curves a, b and S show the optimum relationships between the take-up winding radius data Rt and the optimum stopping torque Ts, in the fast forward mode, recording/playback mode and the rewinding mode, respectively. The storage area in the memory circuit 18 is divided into regions for different tape running modes, and the relationships shown in FIG. 5 are stored in respective regions. In operation, one of these regions is appointed by the tape running speed data V which represent the tape running mode. Meanwhile, the take-up winding radius data Rt is input so as to designate the address corresponding to the data Rt. Then, the reading trigger is input so that the optimum tape stopping torque Ts, which corresponds to the take-up radius data Rt, is read out of the memory circuit 18.

The outputs from the memory circuit 18 and the radius/torque conversion circuit 19 are delivered to the switch circuit 20. The switching operation of the switch circuit 20 is as follows. When it is required to stop the running tape, the running mode instruction circuit selects the tape stopping mode and produces a tape stopping signal which is delivered to a timer operation control circuit 21. Upon receipt of the tape stopping signal, the circuit 21 produces a timer operation signal for operating a timer circuit 22. The timer circuit 22 operates to connect the switch circuit 20 to an "H" terminal and holds this state for a predetermined time from the moment at which the operation mode is switched to the tape stopping mode until the tension in the tape is stabilized. After the lapse of the predetermined time, the timer circuit 22 permits the switch circuit 20 to be connected again to an "L" terminal.

The time length set in the timer circuit 22 corresponds to a period which is necessary for the tape tension to be stabilized after the change-over of the tape running mode. It is possible to arrange the apparatus such that different time lengths are set for different tape running modes and are selected, so that the timer circuit 22 operates for the time length corresponding to the selected tape running mode. It is to be noted, however, that the use of the timer circuit is not essential. For instance, the arrangement may be such that whether the tape running state has been stabilized is ascertained through detection of, for example, the tape tension itself or the state of operation of the reel motor or the capstan motor, and the switch circuit 20 is operated in accordance with the result of the detection. Such a method will enable the tape tension to be controlled more finely and accurately.

The switching signal delivered from the timer circuit 22 to the switch circuit 20 is delivered also to the memory circuit 18, and is used as the reading trigger. Namely, when this signal is input to the memory circuit 18, the data stored in the address corresponding to the take-up winding radius data Rt, which has been delivered to the memory circuit 18, is read out of the memory circuit.

As will be understood from the foregoing description, in the second embodiment explained hereinabove, the switch circuit 20 delivers the optimum tape running torque data Tp derived from the radius/torque conversion circuit 19 during the running of the tape, whereas when the tape is to be stopped, the switch circuit 20 delivers the optimum tape stopping torque data Ts read from the memory circuit 18. Upon receipt of this data, the take-up reel motor driving circuit 23 operates so that the take-up reel motor 24 produces a torque corresponding to the optimum torque data Ts in the direction counter to the direction of taking-up rotation of the take-up reel support 14. As a consequence, the amount of take-up of the tape by the take-up reel (not shown) is controlled in such a manner as to maintain the tape tension constant, thereby enabling the tape to be stopped without any unfavorable effect.

FIG. 6 is a schematic illustration of a third embodiment of the invention which is applied to a tape running and stopping mechanism of a VTR of the direct-driving type in which the reel supports for the take-up reels and the supply reel are driven directly by independent motors. In this Figure, the same reference numerals denote the same parts or members as those in FIG. 1, and a description of such parts or members is omitted to avoid duplication of explanation.

Referring to FIG. 6, a plurality of magnet pieces 1a are attached to the outer peripheral portion of a supply reel support 1 at a constant circumferential pitch, and a fixed pickup head 2 is disposed so as to oppose the path of movement of the magnet pieces. The output from the pickup head 2 is delivered to a comparison signal generator 3 which in turn produces a comparison signal at a frequency corresponding to the period of rotation of the reel support 1 as shown by (a) in FIG. 2. The comparison signal is input to a period measuring circuit 4.

The period measuring circuit 4 also receives reference pulses which are produced by a reference pulse generator 5 and which have a frequency much higher than that of the comparison signal, as shown by (b) in FIG. 2. The period measuring circuit 4 counts the reference pulses and produces period data $C_1$ to $C_4$ which are delivered to a period/radius conversion circuit 25. The period/radius conversion circuit 25 also receives tape running speed data V concerning the tape running mode which has been selected by a tape running mode setting circuit 26. Upon receipt of these signals, the period/radius conversion circuit 25 computes the radius R of the tape wound on the supply reel in accordance with the formula of $R = V t/2\pi$, and delivers the result of the computation as the tape radius data Rs.

The output from the period/radius conversion circuit 25 is supplied both to a memory circuit 27 and the switch 28 and to the switch 29 through switch 28. The switching operation of the switches 28 and 29 is controlled by a stopping instruction signal St which is produced by the running mode setting circuit 26. The stopping instruction signal St is a signal which assumes a high level only when the tape (not shown) has been stopped. When the stopping instruction signal St given by the tape running mode setting circuit 26 assumes the high level, an inverter 30 changes the high signal to a low signal so that the switch 28 is turned off, whereas, when the signal St assumes the low level, the inverter 30 changes the low signal to a high signal so that the switch 28 is turned on.

Thus, in the tape running modes other than the tape stopping mode, the tape radius data Rs concerning the supply reel supplied by the period/radius conversion circuit 25 is fed to the tape running torque control circuit 31 which produces optimum tape running torque corresponding to the radius of the tape wound on the supply reel. When the stopping instruction signal St assumes the low level, the switch 29 is connected to a terminal "L" so that the supply reel tape radius data Rs, which is transmitted through the switch 28, is input to a winding radius conversion circuit 32. The circuit 32 also receives a tape length signal D corresponding to the length of the tape (not shown), input from the tape running mode setting circuit 26. Upon receipt of these signals, the winding radius conversion circuit 32 conducts a computation for determining the radius data Rt concerning the radius of the tape wound on the take-up reel, and delivers the data Rt to a tape running torque generating circuit 33. The tape running torque generating circuit 33 then produces the optimum tape running torque data for the take-up reel corresponding to the radius of the tape wound on the take-up reel.

Meanwhile, the supply reel tape radius data Rs is supplied also to the memory circuit 27 and is temporarily stored in the latter. The content of the memory circuit 27 is changed each time the tape radius data Rs supplied thereto is changed.

The tape winding radius data Rs which is temporarily stored in the memory circuit 27 is read each time a switch 34 is turned on and is delivered to the switch 29 and the radius/torque conversion circuit 35. The switching operation of the switches 29 and 34 is controlled in accordance with the stopping instruction signal St produced by the tape running mode setting circuit 26. Namely, when the tape is stopped, the stopping instruction signal St is changed to the high level, thereby turning the switch 34 on, so that the tape winding radius data Rs temporarily stored in the memory circuit 27 is delivered to the radius/torque conversion circuit 35 and to the switch 29. Since the switch 29 is connected to a terminal H when the stopping instruction signal St assumes the high level, the data Rs is fed to the winding radius conversion circuit 32 which computes the tape winding radius data Rt for the take-up reel. The thus-computed data is supplied to the radius/torque conversion circuit 36.

Thus, the radius/torque conversion circuits 35 and 36 receive tape winding radius data Rs and Rt concerning the radii of the tape wound on the supply reel and the take-up reel, respectively, and produce optimum torque data T corresponding to respective winding radius data.

Each of the radius/torque conversion circuits 35 and 36 comprises a memory table which beforehand stores the optimum torque data for varying radii of the tape wound on the associated reel, so that the optimum torque is read from the table as the address of a specific value of the winding radius data is designated. The memory table of each of the radius/torque conversion circuits 35 and 36 has three table sections one of which is selectively used in accordance with a memory table change-over signal which is produced by a memory table change-over circuit 37a in accordance with the tape running speed data V produced by the tape running mode setting circuit 26.

Referring again to FIG. 3, curves a, b and c represent, respectively, the relationships between the radius of the tape wound on the supply reel and the torque value optimum for the tape radius, in a record/playback mode, high-speed search mode and fast forward-/rewinding mode. Similar relationships between the tape winding radii and torque values exist also on the take-up reel. Each of the radius/torque conversion circuits 35 and 36 selectively uses one of the three memory tables corresponding to the three curves shown in FIG. 3, and delivers to the switches 37 and 38 the optimum torque data corresponding to the input tape winding radius data Rs or Rt. The switches 37 and 38 also receive, respectively, constant torque data from first and second fixed torque generating circuits 39 and 40. The switches 37 and 38, therefore, selectively deliver to the supply reel motor driving circuit 41 and the take-up reel motor driving circuit 42 either the optimum torque data from the radius/torque conversion circuits 35 and 36 or the constant torque data from the fixed torque generating circuits 39 and 40. The states of the switches 37 and 38 are controlled in accordance with the tape running direction data F/R supplied from the tape running mode setting circuit 26.

More specifically, the tape running direction data F/R from the tape running mode setting circuit 26 assumes the high level when the tape is running forward, but assumes the low level when the tape is running backward. The switches 37 and 38 are connected to "H" and "L", respectively, when the tape runs forward and backward, i.e., when the level of the tape running direction data F/R is "H" and "L", respectively. When the tape running direction data F/R assumes the "H" level, the switch 43 also is turned on. As a result, when the tape is running in the forward direction, then the take-up reel motor driving circuit 42 operates in accordance with the constant torque data given by the second fixed torque generating circuit 40, thereby driving the take-up reel motor 44 such that the motor 44 drives the take-up reel support 45 with a constant torque corresponding to the constant torque data. On the other hand, the supply reel motor driving circuit 41 receives the torque data derived from the tape running torque control circuit 31 when the tape is running, whereas, when the tape is being stopped, the torque data is derived from the radius/torque conversion circuit 35, so that the supply reel driving circuit 41 controls the output torque of the supply reel motor 46 so as to maintain tape tension constant during running of the tape, as well as when the tape is being stopped.

Conversely, when the tape is running backward, the tape running direction data F/R from the running mode setting circuit 26 assumes the low level, so that the switches 37 and 38 are connected to "L" terminals, while the switch 47 is turned on by the operation of the inverter 48. Therefore, when the tape is running backward, the supply reel motor driving circuit 41 drives the supply reel motor 46 in accordance with the fixed torque data generated by the first fixed torque generating circuit 39 such that the supply reel motor 46 drives the supply reel support 1 with a constant torque. Thus, the take-up reel motor driving circuit 42 receives the torque data from the tape running torque control circuit 33 during the running of the tape, whereas, when the tape is being stopped, the circuit 42 receives the torque data generated by the radius/torque conversion circuit 36, whereby the torque of the take-up reel motor 44 is controlled in such a manner as to maintain constant tape tension during backward running of the tape, as well as when the tape is being stopped.

As will be understood from the foregoing description, when the tape is to be stopped in the third embodiment of the invention, the torque data optimum for stopping the tape is computed from the tape winding radius data on the supply reel determined immediately before the stopping operation, and the output torque of the supply reel motor is controlled in accordance with the optimum torque data, whereby the amount of feed of the tape from the supply reel is controlled in such a manner as to enable the tape to be stopped under a suitable level of tape tension, thus eliminating any unfavorable effect on the tape.

A description will be given hereinunder of fourth embodiment of the present invention in which the second computing circuit 11 in the first embodiment shown in FIG. 1 generates a pulse signal indicating proper torque corresponding to the tape winding radius data, and the reel motor driving circuit 12 controls the output torque of the reel motor 13 in accordance with the thus obtained pulse signal.

Figure 7A:
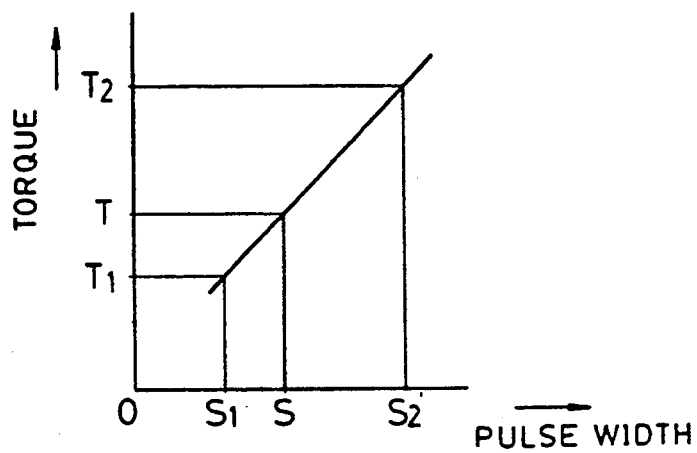
FIG. 7($a$) is a graph showing the relationship between the torque T and the pulse width S in a fourth embodiment of the invention in which the torque of the reel motor is controlled in accordance with the width of applied pulses.
Figure 7B:
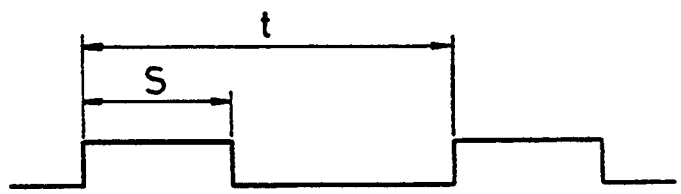
Figure 7C:
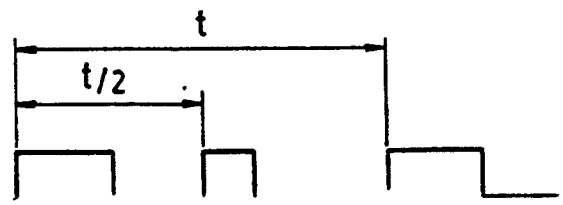

FIG. 7(a) is a graph showing the relationship between the torque T and the pulse width S. FIGS. 7(b) and 7(c) show the manners in which the pulse widths S are set for given torque values T in accordance with a conventional method and in accordance with the present invention, respectively.

Referring to FIG. 7(a), it is assumed here that the torque T is changed within the region between $T_1$ and $T_2$, as the pulse width S is changed from $S_1$ to $S_2$. For instance, when the torque T is to be obtained, the pulse signal supplied to the reel motor should have a pulse width or duty S. In the conventional method, this can be achieved by causing each period of the pulse signals to contain a pulse of a pulse width or duty S. In contrast, according to the fourth embodiment of the invention, the torque $T_1$ is used as the base or reference torque and each period of the pulse signal to be supplied to the reel motor includes a base pulse of a pulse width $S_1$ corresponding to the base torque $T_1$ and an additional pulse having a pulse width $(S - S_1)$ which is the difference between the pulse width S corresponding to the torque T to be obtained and the pulse width $S_1$ corresponding to the base torque $T_1$. For instance, the base pulse of the pulse width $S_1$ is supplied in an earlier part of each period of the pulse signal, while the additional pulse of the pulse width $(S - S_1)$ is supplied in the later part of each period of the pulse signal. Alternatively, the pulse of the pulse width $(S - S_1)$ is supplied in the earlier part, whereas the base pulse of the pulse width $S_1$ is supplied in the later part of each period.

FIG. 8 is a block diagram of a winding radius-pulse width conversion circuit which is used in the fourth embodiment of the present invention. This conversion circuit is constituted by various components such as a character generator 49, a memory 50, a comparator 51, AND gates 52, 54, and 56, NAND gates 53 and 55, OR gates 57 and 58, a flip-flop circuit 59, and a counter 60.

FIG. 9 is a graph showing the relationship between the torque and the pulse width, where the abscissa represents the torque value, while the ordinate represents the pulse width corresponding to the torque value. The tape winding radius data from the memory circuit 10 shown in FIG. 1 and the running mode signal from the running mode instruction circuit 7 are inputted into the character generator 40 as reading address signals. The character generator 49 comprises a ROM (Read Only Memory) with reading addresses corresponding to the winding radius in each running mode. By the assignment of the addresses, the assigned value of the pulse width is read from the character generator 49.

It is assumed here that the duty ratio of the pulse signal for obtaining the torque $T_1$ is 21/40. In this case, the character generator 49 generates a value (10101 in terms of binary code) corresponding to the designated total pulse width, i.e., the duty ratio 21/40, as shown in FIG. 8, and this value is delivered to the memory 50. A reference clock signal generated in the clock generator 61 shown in FIG. 10 is delivered to input Ck of the AND gate 52. This reference clock signal is used as the base for the formation of a signal which represents the pulse width.

FIG. 10 shows an example of the circuit for generating timing pulses $C_1$ and $C_2$ as shown in FIG. 11 by means of the clock generator 61. This circuit includes a modulo-40 counter 62 and flip-flops 63 and 64. The modulo-40 counter 62 counts the pulses generated and delivered by the clock generator 61. The modulo-40 counter 62 has output terminals a, b and c for delivering output signals of high levels when the content of the counter is 0, 20 and 36, respectively. The flip-flops 63 and 64 are intended for producing timing pulses $C_1$ and $C_2$ shown in FIG. 11. More specifically, the signals from the output terminals a and b of the modulo-40 counter 62 are delivered to the set terminal S and the reset terminal R of the flip-flop 64 so that the latter produces the pulse signal $C_1$. Similarly, the signals from the output terminals b and c of the modulo-40 counter 62 are delivered to the set terminal S and the reset terminal R of the flip-flop 63 so that the latter produces the pulse signal $C_2$.

FIG. 11 shows the timings of the pulse signals $C_1$ and $C_2$, as well as the timing of the signal which represents the pulse width. It will be seen that the pulse signal $C_1$ assumes the high level for a period corresponding to 20 clock pulses, i.e., when the content of the counter 62 is 0 to 19, while the pulse signal $C_2$ assumes the high level for a period corresponding to 16 clock pulses, i.e., when the content of the counter 62 is 20 to 36.

The total pulse width signal produced by the character generator shown in FIG. 8, corresponding to the designated total pulse width or duty ratio, is temporarily stored in the memory 50. The counter 60 is a hexadecimal counter which receives, through the gate 52, the clock pulses from the clock generator 61 only when the timing pulse signal $C_1$ assumes the high level, and counts the thus received clock pulses. The comparator 51 conducts a comparison between the data stored in the memory 50 and the data given by the counter 60. When the contents of the lower bits $Q_0$ to $Q_3$ derived from the memory 50 are greater than the output from the counter 60, the comparator 51 produces an output signal of high level through its output terminal Q. For instance, if the content of the lower bits $Q_0$ to $Q_3$ of the memory 50 is 15 in terms of decimal notation in the period in which the timing pulse signal $C_1$ assumes the high level, the values of the bits $Q_0$ to $Q_3$ are 1111 in terms of binary code. In this case, therefore, all the bits $Q_0$ to $Q_3$ assume the high level. Conversely, if the content of these bits is 0 in terms of decimal notation, all the bits $Q_0$ to $Q_3$ assume the low level. The result of the comparison between these outputs from the memory 50 and the outputs from the counter 60, which is conducted by the comparator 51, is delivered to the set terminal S of the flip-flop 59, through the gates 56 and 57. Thus, an output of high level is derived from the Q terminal of the flip-flop 59 when the output from the terminal Q of the comparator 51 assumes the high level. When the counted value output from the counter 60 exceeds the content of the memory 50, the output from the terminal Q of the comparator 51 assumes the low level. This output signal of the low level is delivered through the gates 55 and 58 to the reset terminal R of the flip-flop 59, thereby resetting the latter. It will be seen that the signal derived from the flip-flop 59, which represents the pulse width, assumes high level in the period between the moment at which the flip-flop 59 is set and the moment at which the same is reset. When the level of the output from the terminal $Q_4$ of the memory 50 is high, this output is delivered to the set terminal S of the flip-flop 59 so that the latter is set, whereas, when the level of the output from the terminal $Q_4$ is low, this signal is delivered to the reset terminal R of the flip-flop 59 thereby to reset the latter. It will be seen that the level of the output from the terminal Q of the flip-flop 59 is switched between high and low levels depending on the content of the memory 50 and in accordance with the timing pulses $C_1$ and $C_2$.

The operation of this embodiment will be described hereinunder with reference to FIGS. 8 and 9. The memory circuit 10 and the running mode instruction circuit 7 in FIG. 1 deliver the tape winding radius data and the tape running mode signal, respectively, and a pulse width is set in the character generator 49 in accordance with the thus-delivered radius data and running mode signal. Assuming here that a pulse width corresponding to 21/40 in terms of the duty ratio is to be obtained, a binary coded value 10101, which corresponds to 21 in decimal notation, is set in the character generator 49. This value is stored in the memory 50. Meanwhile, the counter 60 counts pulses which are received in the period in which the timing pulse signal $C_1$ the high level. The value stored in the memory 50 and the value counted by the counter 60 are compared with each other by the comparator 51. If the value derived from the memory 50 exceeds the value from the counter 60, a signal of high level is output from the terminal Q of the comparator 51. In consequence, the terminal Q of the flip-flop 59 delivers a pulse signal which assumes high level for a period corresponding to 5 clock pulses, i.e., from 0 to 4, in terms of decimal notation and thereafter low level, as shown in FIG. 11.

When the timing pulse signal $C_2$ takes the high level, the terminal $Q_4$ of the memory 50 delivers an output of high level to the flip-flop 59 through the gates 54 and 57, thereby setting the flip-flop 59. The flip-flop 59 is reset when the level of the timing pulse signal $C_2$ is changed to low level. In consequence, a signal having a waveform as shown in FIG. 11 is derived from the terminal Q of the flip-flop 59.

AS will be understood from the foregoing description, a pulse having a resolving power of 1/40 is obtained when the timing pulse signal $C_1$ assumes the high level, whereas a pulse having a resolving power of 16/40 is obtained when the timing pulse signal $C_2$ assumes high level. The pulse width, which is 21/40 in terms of the duty ratio in the illustrated case, can be varied as desired by changing the value of the output from the character generator 49.

The signal representing the pulse width, output from the terminal Q of the flip-flop 59 shown in FIG. 8, is delivered to the reel motor driving circuit 12 shown in FIG. 1. Upon receipt of this signal, the reel motor driving circuit 12 controls the reel motor 13 such that the supply reel motor 13 produces a reverse torque of a level corresponding to the signal representing the pulse width shown in FIG. 11. As will be understood from the foregoing description, the fourth embodiment makes it possible to form the control signal for controlling the reel motor driving circuit in a very short processing time. As used herein a "first torque control data output means" includes clock generator 61, modulo-40 counter 62, character generator 49, memory 50, and comparator 51. Also, a "pulse signal generator" includes comparison signal generator 3, reference pulse generator 5, and period measuring circuit 4.

A description will be made hereinunder as to a fifth embodiment of the invention in which the second computing circuit 11 shown in FIG. 1 produces a pulse signal of a pulse width corresponding to the tape winding radius data, and the torque of the reel motor 13 is controlled by the reel motor driving circuit 12 in accordance with this pulse signal.

FIG. 12(a) is a block diagram of a radius-pulse width conversion circuit which is used in the fifth embodiment. This conversion circuit has a character generator 65, a memory 66, a comparison circuit 67, AND gates 70, 72, 74, and 76, NAND gates 69, 71, 73 and 75 and OR gates 77 and 78, a flip-flop 79, and a counter 80. FIG. 12(b) shows the relationship between the pulse width designated in the character generator 65 and the bits of the memory 66.

The tape winding radius data from the memory circuit 10 and the tape running mode signal from the running mode instruction circuit 7 in combination form an address signal which is delivered to the character generator 65. The character generator 65 is constituted by, for example, a ROM.

FIG. 14 shows the relationship between the tape winding radius and the pulse width, using the tape running mode signals such as high-speed playback mode (CUE) and playback/recording mode (P/R) as parameters. The abscissa and the ordinate represent, respectively, the tape radius and the pulse width. The relationship between the tape radius and the pulse width for each tape running mode is stored in the character generator 65. Thus, the tape running mode signals and the tape radius signals in combination form addresses of the memory in the character generator 65. It is, therefore, possible to read the pulse width corresponding to the instant tape radius and the instant tape running mode, by designating the tape radius and the tape running mode as the address. The thus read pulse width is delivered to the memory 66.

FIG. 13 shows an example of the circuit for generating timing pulses $C_1$, $C_2$, $C_3$ and $C_4$, while FIG. 17 shows the time charts of the timing pulses generated by the circuit shown in FIG. 13.

The circuit shown in FIG. 13 has a reference clock generator 81 for producing clock signals which are used as the base for the formation of signals of different pulse widths, and a modulo-40 counter 82 for conducting modulo-40 counting of the pulses generated by the reference clock generator 81. The modulo-40 counter 82 have output terminals a, b, c and d which assume high levels, respectively, when the content of the counter 82 is 0, 16, 20 and 24. The timing pulse $C_1$ assumes the high level throughout a period corresponding to 16 clock pulses, i.e., clock pulses 0 to 15, while the timing pulse $C_2$ assumes the high level for a period corresponding to 4 clock pulses, i.e., clock pulses 16 to 19. The timing pulses $C_3$ and $C_4$ assume high level, respectively, for periods corresponding to 4 clock pulses (clock pulses 20 to 23) and 16 clock pulses (clock pulses 24 to 39). The clock pulses $C_1$, $C_2$, $C_3$ and $C_4$ are generated by flip-flops 83, 84, 85 and 86. The flip-flop 86 has a set terminal S which receives the signal from the terminal a of the 40-notation counter 82 and a reset terminal R which receives the signal from the terminal b of the same counter 82. Thus, the flip-flop 86 produces the timing pulse $C_1$ which lasts for a period between the moment at which the flip-flop 86 receives the signal from the terminal a and the period at which the flip-flop 86 receives the signal from the terminal b of the 40-notation counter 82. Similarly, the flip-flop 85 produces the timing pulse $C_2$ upon receipt of signals from the terminals b and c at its set and reset terminals S and R. The flip-flop 84 has set and reset terminals S and R which receive the signals from the terminals c and d of the 40-notation counter 82; and the flip-flop 84 produces the timing pulse $C_3$ in accordance with these signals. The flip-flop 83 produces the timing pulse $C_4$ upon receipt of the signals from the terminals d and a at its set and reset terminals S and R.

The data concerning the designated pulse width value given by the character generator 65 is temporarily stored in the memory 66. The counter 80 is a hexadecimal counter which counts the clock pulses received in the period in which the gate 68 is kept open by the high level of the timing pulse $C_1$. The data stored in the memory 66 and the count data of the counter 80 are compared with each other by the comparison circuit 67. If the content of the lower bits $Q_0$ to $Q_3$ of the output from the memory 66 is greater than the output from the counter 80, the signal output from the terminal Q of the comparison circuit 67 assumes the high level. When the timing pulse signal $C_1$ assumes the high level, the bits $Q_0$ to $Q_3$ assume high level when the content of these bits is 15 in terms of decimal notation, whereas, when the content is 0, all the bits $Q_0$ to $Q_3$ assume low level. The output of the comparison circuit 67 is delivered from the terminal Q to the set terminal S of the flip-flop 79 through gates 76 and 77. The output from the terminal Q of the flip-flop 79 assumes the high level if the signal from the terminal Q of the comparison circuit 67 is of high level. When the content of the counter 80 is increased to exceed the output from the memory 66, the level of the signal delivered from the terminal Q of the comparator 67 is changed to low level. This low level signal is delivered through the gates 75 and 78 to the reset terminal R of the flip-flop 79, thereby resetting the latter. Thus, the signal representing the pulse width assumes the high level for a period between the moment at which the flip-flop 79 is set and the moment at which the same is reset. In the period in which the timing pulse signal $C_2$ assumes the high level, the flip-flop 79 is set through the gates 74 and 77 by the signal derived from the terminal $Q_4$ of the memory 66 when the signal from the terminal $Q_4$ assumes high level and is reset through the gates 73 and 78 when the same signal assumes low level. Similarly, the flip-flop 79 is set and reset, respectively, through the gates 72, 77 and 71, 78 by the high and low level signals derived from the terminal $Q_5$ of the memory 66. The flip-flop 79 is also set and reset by high and low level signals delivered from the terminal $Q_6$ of the memory 66 through the gates 70,77 and 69,78, respectively. It will be seen that the level of the signal derived from the terminal Q of the flip-flop 79 is switched between the high level and the low level depending on the content of the memory 66 in accordance with the timing pulses $C_1$, $C_2$, $C_3$ and $C_4$.

The operation of the fifth embodiment will be described hereinunder on an assumption that a pulse width corresponding to 21/40 in terms of the duty ratio is to be obtained, with reference to FIG. 12(a) and FIG. 16. FIG. 16 is a time chart showing various signals used in the fifth embodiment for obtaining the pulse width corresponding to the duty ratio value of 21/40. As the first step, the memory circuit 10 and the running mode instruction circuit 7 provide the tape winding radius data and the tape running mode data, and a pulse width corresponding to these data is set by the character generator 65. In this case, since the pulse width is set to be 21/40 in terms of duty ratio, the output from the character generator 65 is represented by 1000101 from the upper to lower bits. This value which corresponds to the designated pulse width is stored in the memory 66. As the pulse width is set by the character generator 65 in the manner described, the terminal Q of the flip-flop 79 delivers a pulse $C_{1a}$ which assumes high level for a time length corresponding to 5 clock pulses, i.e., clock pulses 0 to 4, and thereafter low level, in the period in which the timing pulse signal $C_1$ assumes the high level. In the period in which the timing pulse signal $C_2$ is held at the high level, since the level of the signal from the terminal $Q_4$ of the memory 66 is low, the signal derived from the terminal Q of the flip-flop 79 is a pulse $C_{2a}$ of the low level. Similarly, in the period in which the timing pulse signal $C_3$ is held at the high level, since the level of the signal from the terminal $Q_5$ of the memory 66 is low, the signal derived from the terminal Q of the flip-flop 79 is a pulse $C_{3a}$ of the low level. In the period in which the timing pulse signal $C_4$ assumes the high level, the output signal of high level from the terminal $Q_6$ of the memory 66 is delivered through the gates 70 and 77 to the flip-flop 79 thereby setting the same. The flip-flop 79 is reset when the timing pulse $C_4$ falls. In this case, therefore, a pulse $C_{4a}$ is produced as the output of the flip-flop 79. In consequence, the Q terminal of the flip-flop 79 delivers a signal representing the pulse width 21/40 as shown in FIG. 16.

Thus, pulses having resolving powers of 1/40 second, 4/40 second, and 16/40 second are produced in the periods in which the timing pulse signals $C_1$, $C_2$, $C_3$ and $C_4$ assume high level, respectively. The pulse width thus obtained can be varied by changing the value of the duty ratio set in the character generator.

FIG. 15 is a diagram showing the relationship between the pulse width and the torque of the reel motor. In the fifth embodiment described hereinbefore, the torque of the reel motor is controlled by varying the pulse width through selective use of different resolving powers such as 1/40 second, 4/40 second and 16/40 second. However, in the region where the torque is very small, it is difficult to obtain a linear relation between the motor torque and the pulse width, due to various reasons such as fluctuation in operation characteristics of the motor, fluctuation in the precision of the motor shaft, and so forth.

In the described fifth embodiment of the invention, therefore, a signal of a predetermined pulse width corresponding to the minimum constant torque value is supplied to the reel motor driving circuit when the required motor torque has come down below a predetermined minimum level so that the minimum constant motor torque is maintained in this region. It is possible to arrange the apparatus such that the pulse width of the signal supplied to the reel motor driving circuit is divided into a portion for the minimum constant torque and a portion for greater torque levels. This arrangement permits the control to be conducted in such a manner that the control of the pulse width portion for the minimum constant torque is executed coarsely, while the pulse width portion for the greater varying torque is performed finely. It may be possible to use a microcomputer for the purpose of generating timing pulses for forming signals of these pulse widths and also for other controls. In such a case, however, it is necessary to conduct a time sharing control for enabling these different tasks to be performed by the microcomputer. This means that the operation for the formation of the pulse width signal has to be interrupted by another operation. In the described fifth embodiment of the invention, since pulse signals of different resolving powers are used for the formation of the pulse width signal, it is possible to obtain high precision control of the pulse width by arranging the apparatus such that the interruption by another operation is allowed during processing with low or coarse resolving power, whereas the interruption is forbidden during processing with high or fine resolving power. In addition, the division of the pulse width into a portion for the minimum constant torque and a portion for greater varying torque values enables the period of generation of the pulse width to be shortened, which in turn makes it possible to reduce the ripple of the waveform of the pulse width signal through a low-pass filter.

What is claimed is:

1. A device for running a tape-like medium between a pair of reels, comprising:
   a driving motor for rotatively driving one of said reels;
   winding radius data generating means for generating, in accordance with a state of rotation of the one reel driven by said driving motor, winding radius data corresponding to a radius of said tape-like medium wound on said one reel;
   pulse width setting data generating means for generating N-bit data, N being an integer not smaller than 2, which sets a pulse width of a pulse signal corresponding to the winding radius data generated by said winding radius data generating means;
   pulse signal generating means for generating, when a value indicated by the data generated by said pulse width setting data generating means is not greater than a predetermined value, a first pulse signal corresponding to said data, and for, generating when the value indicated by the data generated by said pulse width setting data generating means exceeds said predetermined value, a second pulse signal corresponding to said data and a third pulse signal; and torque control means for controlling a driving torque of said driving motor in accordance with a pulse width of the pulse signal generated by said pulse signal generating means.

2. A device according to claim 1, wherein said pulse signal generating means successively generates said second pulse signal corresponding to said data and said third pulse signal, when said value indicated by said data generated by said pulse width setting data generating means exceeds said predetermined value.

3. A device according to claim 1, wherein each said first pulse signal and each said second pulse signal is a pulse signal the pulse width of which varies in accordance with the N-bit data generated by said pulse width setting data generating means, and wherein said third pulse signal is a pulse signal having a predetermined pulse width.

4. A device according to claim 1, wherein said pulse signal generating means generates, when the value represented by a most significant bit of said N-bit data generated by said pulse width setting data generating means is 0, said first pulse signal corresponding to said N-bit data, and generates, when the value represented by the most significant bit of said N-bit data generated by said pulse width setting data generating means is 1, said second pulse signal corresponding to the value represented by bits other than the most significant bit of said N-bit data and said third pulse signal.

5. A device according to claim 4, wherein each said first pulse signal and each said second pulse signal is a pulse signal the pulse width of which varies in accordance with the N-bit data generated by said pulse width setting data generating means, and wherein said third pulse signal is a pulse signal having a predetermined pulse width.

6. A device according to claim 4, wherein said pulse signal generating means includes:
   a clock signal generating circuit for generating a clock signal;
   a first counter circuit operative in synchronization with said clock signal generated by said clock signal generating circuit so as to produce a first period appointing signal which takes a high level during a first period and a second period appointing signal which takes a high level during a second period different from said first period;
   a second counter circuit operative in synchronization with said clock signal generated by said clock signal generating circuit during the period in which said first period appointing signal output from said first counter circuit takes the high level, so as to produce a count data;
   a comparator circuit which compares the value represented by bits other than the most significant bit of said N-bit data generated by said pulse width setting data generating means with the value represented by the count data generated by said second counter circuit; and
   a logical circuit which, within the period in which said first period appointing signal output from said first counter circuit takes said high level, produces a pulse signal which takes a high level, during a period in which said comparator circuit detects that the value represented by said count data generated by said second counter circuit is exceeded by the value represented by bits other than the most significant bit of said N-bit data generated by said pulse width setting data generating means, said logical circuit also producing, within the period in which said second period appointing signal output from said first counter circuit takes the high level, a pulse signal which takes a high level for a predetermined period when the value represented by the most significant bit of said N-bit data generated by said pulse width setting data generating means is 1.

7. A device according to claim 1, wherein said winding radius data generating means includes:
   detecting means for detecting a period of rotation of said reel rotatively driven by said driving motor; and
   winding radius data generating circuitry for generating winding radius data corresponding to the radius of said tape-like medium wound on said reel, in accordance with the period of rotation of said reel detected by said detecting means.

8. A device according to claim 7, wherein said winding radius data generating circuitry includes a memory circuit for storing winding radius data corresponding to the winding radius of said tape-like medium wound on said reel, in relation to the period of rotation of said reel.

9. A device according to claim 1, wherein said pulse generating means successively produces said first pulse signal corresponding to less significant K-bit data, K being a positive integer smaller than N, of said N-bit data generated by said pulse width setting data generating means, and said second pulse signal corresponding to more significant (N-K)-bit data of said N-bit data.

10. A device according to claim 9, wherein the pulse width of said first pulse signal varies in accordance with a change in the values of the less significant K-bit data of said N-bit data generated by said pulse width setting data generating means, and wherein the pulse width of said second pulse signal varies in accordance with a change in the value of the more significant (N - K)-bit data of said N-bit data generated by said pulse width setting data generating means, in an amount which is different from the amount of variation of the pulse width of said first pulse signal.

11. A device according to claim 10, wherein the amount of variation of the pulse width of said second pulse signal is greater than the amount of variation of said first pulse signal.

12. A device according to claim 10, wherein the pulse width of said second pulse signal varies non-linearly in accordance with a change in the value of the more significant (N - K)-bit data of said N-bit data generated by said pulse width setting data generating means.

13. A device according to claim 9, wherein said pulse signal generating means includes:
   a clock signal generating circuit for generating a clock signal;
   a first counter circuit operative in synchronization with said clock signal generated by said clock signal generating circuit so as to produce a first period appointing signal which takes a high level during a first period and a second period appointing signal which takes a high level during a second period different from said first period;
   a second counter circuit operative in synchronization with said clock signal generated by said clock signal generating circuit during the period in which said first period appointing signal output from said first counter circuit takes the high level, so as to produce a count data;
   a comparator circuit which compares the value represented by less significant K bits of said N-bit data generated by said pulse width setting data generating means with the value represented by the count data generated by said second counter circuit; and a logical circuit which, within the period in which said first period appointing signal output from said first counter circuit takes said high level, produces a pulse signal which takes a high level, during a period in which said comparator circuit detects that the value represented by said count data generated by said second counter circuit is exceeded by the value represented by the less significant K bits of said N-bit data generated by said pulse width setting data generating means, said logical circuit also producing, within the period in which said second period appointing signal output from said first counter circuit takes the high level, a pulse signal which takes a high level in accordance with the value of the more significant (N - K) bits of said N-bit data generated by said pulse width setting data generating means.

14. A device for running a tape-like medium between a pair of reels, comprising:

a driving motor for rotatively driving one of said reels;

running mode appointing means for appointing any one of a plurality of running modes which have different running speeds of said tape-like medium;

winding radius data generating means for generating, in accordance with a state of rotation of said one reel driven by said driving motor and in according with the running mode appointed by said running mode appointing means, winding radius data corresponding to the radius of said tape-like medium wound on said reel;

pulse width setting data generating means for generating N-bit data, N being an integer not smaller than 2, which sets the pulse width of a pulse signal corresponding to the winding radius data generated by said winding radius data generating means and corresponding to the running mode appointed by said running mode appointing means;

pulse signal generating means for generating, when the value indicated by said data generated by said pulse width setting data generating means is not greater than a predetermined value, a first pulse signal corresponding to said data, and for generating, when the value indicated by said data generated by said pulse width setting data generating means exceeds said predetermined value, a second pulse signal corresponding to said data and a third pulse signal; and torque control means for controlling the driving torque of said driving motor in accordance with a pulse width of said pulse signal generated by said pulse signal generating means.

15. A device according to claim 14, wherein said winding radius data generating means includes:

detecting means for detecting the period of rotation of said reel rotatively driven by said driving motor; and winding radius data generating circuitry for generating winding radius data corresponding to the radius of said tape-like medium wound on said reel, in accordance with the period of rotation of said reel detected by said detecting means and in accordance with the running mode appointed by said running mode appointing means.

16. A device according to claim 15, wherein said winding radius data generating circuitry includes a memory circuit for storing winding radius data corresponding to the winding radius of said tape-like medium wound on said reel, in relation to the period of rotation of said reel for each of said running modes.

17. A device according to claim 14, wherein said pulse signal generating means successively generates said second pulse signal corresponding to said N-bit data and said third pulse signal, when said value indicated by said N-bit data generated by said pulse width setting data generating means exceeds said predetermined value.

18. A device according to claim 17, wherein each said first pulse signal and each said second pulse signal is a pulse signal the pulse width of which varies in accordance with the N-bit data generated by said pulse width setting data generating means, and wherein said third pulse signal is a pulse signal having a predetermined pulse width.

19. A device according to claim 17, wherein said pulse width setting data generating means includes a memory circuit which stores N-bit data for setting the pulse width of said pulse signal, in relation to the winding radius data for each of said running modes.

20. A device according to claim 14, wherein said pulse signal generating means generates, when the value represented by the most significant bit of said N-bit data generated by said pulse width setting data generating means is 0, said first pulse signal corresponding to said N-bit data, and generates, when the value represented by the most significant bit of said N-bit data generated by said pulse width setting data generating means is 1, said second pulse signal corresponding to the value represented by bits other than the most significant bit of said N-bit data and said third pulse signal.

21. A device according to claim 20, wherein each said first pulse signal and each said second pulse signal is a pulse signal the pulse width of which varies in accordance with the N-bit data generated by said pulse width setting data generating means, and wherein said third pulse signal is a pulse signal having a predetermined pulse width.

22. A device according to claim 20, wherein said pulse signal generating means includes:

a clock signal generating circuit for generating a clock signal;

a first counter circuit operative in synchronization with said clock signal generated by said clock signal generating circuit so as to produce a first period appointing signal which takes a high level during a first period and a second period appointing signal which takes a high level during a second period different from said first period;

a second counter circuit operative in synchronization with said clock signal generated by said clock signal generating circuit during the period in which said first period appointing signal output from said first counter circuit takes the high level, so as to produce a count data;

a comparator circuit which compares the value represented by bits other than the most significant bit of said data generated by said pulse width setting data generating means with the value represented by the count data generated by said second counter circuit; and a logical circuit which, within the period in which said first period appointing signal output from said first counter circuit takes said high level, produces a pulse signal which takes a high level, during a period in which said comparator circuit detects that the value represents by said count data generated by said second counter circuit is exceeded by the value represented by bits other than the most significant bit of said N-bit data generated by said pulse width setting data generating means, said logical circuit also producing, within the period in which said second period appointing signal output from said first counter circuit takes the high level, a pulse signal which takes a high level for a predetermined period when the value represented by the most significant bit of said data generated by said pulse width setting data generating means is 1.

23. A device according to claim 14, wherein said pulse successively produces a first pulse signal corresponding to less significant K-bit data, K being positive integer smaller than N, of said N-bit data generated by said pulse width setting data generating means and a second pulse signal corresponding to more significant (N-K)-bit data of said N-bit data.

24. A device according to claim 23, wherein the pulse width of said first pulse signal varies in accordance with a change in the values of the less significant K-bit data of said N-bit data generated by said pulse width setting data generating means, and wherein the pulse width of said second pulse signal varies in accordance with a change in the value of the more significant (N - K)-bit data of said N-bit data generated by said pulse width setting data generating means, in an amount which is different from the amount of variation of the pulse width of said first pulse signal.

25. A device according to claim 24, wherein the amount of variation of the pulse width of said second pulse signal is greater than the amount of variation of said first pulse signal.

26. A device according to claim 25, wherein the pulse width of said second pulse signal varies non-linearly in accordance with a change in the value of the more significant (N - K)-bit data of said N-bit data generated by said pulse width setting data generating means.

27. A device according to claim 23, wherein said pulse width setting data generating means includes a memory circuit for storing N-bit data for setting the pulse width of the pulse signal, in relation to the winding radius data for each of said running modes.

28. A device according to claim 23, wherein said pulse signal generating means includes:
a clock signal generating circuit for generating a clock signal;
a first counter circuit operative in synchronization with said clock signal generated by said clock signal generating circuit so as to produce a first period appointing signal which takes a high level during a first period and a second period appointing signal which takes a high level during a second period different from said first period;
a second counter circuit operative in synchronization with said clock signal generated by said clock signal generating circuit during the period in which said first period appointing signal output from said first counter circuit takes the high level, so as to produce a count data;
a comparator circuit which compares the value represented by less significant K bits of said N-bit data generated by said pulse width setting data generating means with the value represented by the count data generated by said second counter circuit; and
a logical circuit which, within the period in which said first period appointing signal output from said first counter circuit takes said high level, produces a pulse signal which takes a high level, during a period in which said comparator circuit detects that the value represented by said count data generated by said second counter circuit is exceeded by the value represented by the less significant K bits of said N-bit data generated by said pulse width setting data generating means, said logical circuit also producing, within the period in which said second period appointing signal output from said first counter circuit takes the high level, a pulse signal which takes a high level in accordance with the value of the more significant (N - K) bits of said N-bit data generated by said pulse width setting data generating means.

* * * * *

UNITED STATES PATENT AND TRADEMARK OFFICE
CERTIFICATE OF CORRECTION

PATENT NO. : 5,341,073
DATED : August 23, 1994
INVENTOR(S) : Harigaya et al.

It is certified that error appears in the above-indentified patent and that said Letters Patent is hereby corrected as shown below: On the title page, <u>At [30] Foreign Application Priority Data</u>

"Dec. 25, 1985 [JP] Japan . . . 60-297225" should read --Dec. 27, 1985 [JP] Japan . . . 60-297225--.

<u>Column 5</u>

Line 1, "FIG. (c)" should read --FIG. 7(c)--.
Line 8, "the-torque" should read --the torque--.

<u>Column 8</u>

Line 30, "S" should read --c--.
Line 68, "selected," should read --selected--.

<u>Column 11</u>

Line 19, "mode." should read --mode, respectively.--

<u>Column 12</u>

Line 18, "torque data optimum" should read --optimum torque data--.
Line 28, "fourth" should read --a fourth--.

<u>Column 13</u>

Line 12, "generator 40" should read --generator 49--.

UNITED STATES PATENT AND TRADEMARK OFFICE
CERTIFICATE OF CORRECTION

PATENT NO. : 5,341,073
DATED : August 23, 1994
INVENTOR(S) : Harigaya et al.

It is certified that error appears in the above-indentified patent and that said Letters Patent is hereby corrected as shown below:

Column 15

Line 1, "AS" should read --As--.
    Line 38, "75and" should read --75 and--.

Column 16

Line 7, "have" should read --has--.

Column 18

Line 64, "for, generating" should read --for generating,--.

Column 21

Line 30, "according" should read --accordance--.

Column 23

Line 4, "represents" should read --represented--.

Signed and Sealed this

Fourteenth Day of March, 1995

Attest:

BRUCE LEHMAN

*Attesting Officer*      *Commissioner of Patents and Trademarks*